Patented July 20, 1948

2,445,693

UNITED STATES PATENT OFFICE 2,445,693

PREPARATION OF ACRYLONITRILE FROM HYDROCARBONS AND HCN

Frank Porter and Glenn A. Nesty, Morristown, N. J., assignors to Allied Chemical & Dye Corporation, a corporation of New York No Drawing. Application April 11, 1946, Serial No. 661,359

14 Claims. (Cl. 260—465.3)

This invention relates to a process for the preparation of acrylonitrile by vapor phase reaction of organic compounds, especially hydrocarbons, with HCN. More specifically, the invention relates to a process for the preparation of acrylonitrile by substantially non-catalytic pyrolysis of a gaseous mixture of HCN with an organic compound of the class consisting of ethylene and hydrocarbons which normally yield ethylene on pyrolysis. This application is a continuation-in-part of our co-pending prior application Serial No. 515,120, filed December 21, 1943, now abandoned.

German Patent No. 557,234 discloses that acrylonitrile can be prepared by passing a mixture of acetylene and HCN over a heated catalyst, such as barium cyanide, at a temperature of 400° to 500° C. This process is subject to the disadvantage that the catalyst becomes fouled with carbon and tarry matter, resulting in loss of its activity and a consequent decrease in the efficiency of the reaction.

We have now discovered that acrylonitrile can be obtained by reacting a gaseous mixture of HCN and aliphatic non-acetylenic hydrocarbons having at least 2 carbon atoms at a temperature of 750° to 1000° C. for a reaction period of about 0.5 to 3.25 seconds and thereupon cooling the reaction mixture to recover the acrylonitrile produced. Preferably, temperatures of 800° to 900° C. and a reaction period of about 0.5 to 2 seconds are employed. The optimum temperature range is from 850° to 870° C. A mixture of liquid reaction products containing acrylonitrile as its principal component is thus obtained in high yield. An important advantage of the invention resides in the fact that it is unnecessary to employ a catalyst to obtain high yields of acrylonitrile. Hence the reaction is preferably carried out in a non-catalytic or substantially non-catalytic reaction zone, thus avoiding the trouble and expense of catalyst provision and maintenace. It will be appreciated that various materials suitable for construction of the reaction zone may have a slight but unimportant catalytic effect. The expression "substantially non-catalytic reaction zone" is used herein in a sense to include reaction zones containing or surrounded by materials having no pronounced catalytic effect.

The process of the invention is advantageously carried out in a continuous manner by passing a gaseous mixture of the hydrocarbon and HCN through a reaction zone, heated to reaction temperature, at such a rate that the mixture remains therein for the desired reaction period. For example, the reaction can be carried out in a tubular reactor of refractory non-catalytic material, such as silica, quartz or porcelain. The gaseous mixture can be preheated to a temperature approaching the reaction temperature range before entering the reactor to insure that the reaction temperature will be rapidly attained when the gases enter the reaction zone. The gases issuing from the reaction zone are cooled as rapidly as possible to avoid undesirable side reactions, and the acrylonitrile and other liquid reaction products are separated from the gases by condensation. The gaseous mixture can also be passed through a series of reactors heated to reaction temperature, the mixture being cooled as it issues from each reactor to condense and separate the acrylonitrile produced therein.

In continuous operation, as above described, the reaction period in each reaction zone is determined by the space velocity of the gaseous mixture. The expression "space velocity" as herein employed refers to the theoretical volume, at 0° C. and a pressure of 1 atmosphere, of the gaseous mixture introduced into the reaction zone per hour, per unit volume of the reaction zone. Thus the units of space velocity herein specified are hours$^{-1}$, or, if the reaction zone volume is taken as a unit, then the space velocity is in terms of volumes per hour of the gaseous mixture at 0° C. and 1 atmosphere. When operating at substantially atmospheric pressure with the reaction zone at 750° to 1000° C., a space velocity within the range 300 to 1500 hrs.$^{-1}$ is suitable. When operating within the preferred temperature range of 800° to 900° C., the space velocity is preferably within the range of 450 to 1500 hrs.$^{-1}$. Within the aforesaid ranges, higher space velocities (or shorter reaction periods) are preferably maintained when higher temperatures are used, and lower space velocities (or longer reaction periods) are maintained when lower temperatures are used. For example, at a temperature of 870° C., which is within the optimum temperature range, a space velocity of 750 to 1200 hrs.$^{-1}$ (corresponding to a reaction period of about 0.7 to 1.1 seconds) is satisfactory, while at higher and lower temperatures, respectively, higher and lower space velocities are preferably maintained. It has been found that the reaction velocity is approximately doubled upon increasing the temperature by 30° C. in the vicinity of the optimum temperature range. However, within a range of 840° to 900° C., the yield of acrylonitrile, based on the amount of reagents consumed, remains close to the optimum yields obtained at 870° C. At temperatures above 900° C., the yield of acrylonitrile declines, larger amounts of liquid by-products are formed, and decomposition of HCN becomes perceptible, so that at temperatures above 1000° C. operation becomes so inefficient as to be of no practical value. As the temperature is decreased substantially below 870° C., the rate of reaction decreases. While this effect can be offset at first by decreasing the space velocity (or increasing the reaction period), as the temperature is decreased below 800° C. the compensating effect of decreasing the space velocity (or increasing the reaction period) is no longer available, since side reactions are increasingly promoted, causing losses in yield which render operation no longer practical at temperatures below 750° C. and space velocities below 300 hrs.$^{-1}$.

Recovery of the reaction products can be accomplished, for example, by fractional condensation from the gaseous reaction mixture in a series of condensers maintained at successively decreasing temperature; or all of the readily condensible components may be recovered in a single low-temperature condensation. When more than one reactor is employed, the condenser (or condensers) between the reactors is preferably cooled at a temperature low enough to condense substantially all of the acrylonitrile produced and only a minor portion (e. g. not more than about 30%) of the HCN in the effluent gases (e. g. a temperature of about 20° C.). The HCN in the tail gases can be recovered by absorption in suitable media, for instance, in aqueous alkali, and olefins remaining in the gases can be absorbed in concentrated sulfuric acid.

Substantially atmospheric pressure is preferably maintained in the reaction zone, for example, by venting the recovery equipment to the atmosphere, so that the pressure in the reaction zone only exceeds atmospheric pressure by a small increment equivalent to the back pressure of the usual condensing and absorbing equipment.

Ethylene, propylene, butene-1, propane, n-butane, isobutane, n-hexane, and No. 2 fuel oil (i. e. a petroleum fraction boiling from 250° to 400° C.) are suitable as hydrocarbon intermediates. Preferably, aliphatic hydrocarbons boiling within the range of from −104° to 400° C. are employed. Mixtures containing relatively large proportions of alicyclic hydrocarbons, for example cyclohexane and its homologs, may be employed since such hydrocarbons perform in a manner similar to the aliphatic hydrocarbons.

When high molecular weight non-aromatic hydrocarbons such as heavy petroleum fractions are employed, it is generally preferable to subject them to a cracking process before introducing them into the reaction zone together with HCN, in order to avoid deposition of excessive amounts of carbon in the reaction zone. Volatile hydrocarbons, such as hexane, butane, or propane and light gas oil are satisfactory without preliminary cracking.

Reaction of HCN with organic compounds other than ethylene, but which normally yield ethylene on pyrolysis, in the process of the invention, apparently does not involve merely a pyrolysis of the organic compound to form ethylene and reaction of the latter with HCN as if ethylene had been originally employed. Thus, it was found that pyrolysis of a mixture of butane and HCN in the present process produced a yield of acrylonitrile (mixed with acetonitrile) amounting to 90% of the yield obtained under similar conditions from a mixture containing the same proportions by weight of ethylene and HCN, whereas pyrolysis of butane alone normally produces only 40% to 50% of its weight of ethylene.

A wide range of proportions of the organic compound and HCN can be employed in the mixture subjected to pyrolysis, varying, for example, from ⅕ to 5 parts of HCN for each part by weight of hydrocarbon.

The pressure employed is preferably substantially atmospheric, since superatmospheric pressures increase byproduct formation, while subatmospheric pressures tend to decrease the rate of formation of the nitriles.

Inert diluent gases may be present in the gaseous mixture but presence of substantial amounts thereof tends to reduce the yield by diminishing the rate of reaction. Hence, reaction mixtures containing not more than 75 mol percent of an inert diluent gas are employed, and preferably no substantial amounts of diluent gases are present.

Minor amounts of moisture in the gaseous reaction mixture (e. g. an amount corresponding to saturation of the mixture with water vapor at atmospheric temperatures) are not injurious. However, the presence of large amounts of water vapor in the reaction mixture subjected to pyrolysis, adversely affects the yields of acrylonitrile. For example, formamide, which decomposes into equimolecular amounts of HCN and water under the pyrolytic conditions of the reaction, is not the equivalent of HCN in the process. Preferably, the reaction mixture subjected to pyrolysis should not contain water vapor in amounts exceeding 20 mol percent.

Acrylonitrile and acetonitrile are formed as the principal reaction products in the process of this invention, the weight ratio of acrylonitrile to acetonitrile being about 3:2. Under optimum conditions, acrylonitrile and acetonitrile are recovered in amounts corresponding to 82% of the HCN combined in the form of liquid reaction products, the remainder being combined in the form of other nitriles or nitrogen-containing compounds. Liquid by-products normally amount to not more than 30 to 40 parts by weight per 100 parts of the acrylonitrile-acetonitrile mixture. These by-products comprise, for example, 14.5 parts by weight of high-boiling hydrocarbons and tar, 10.8 parts of benzonitrile, 3.7 parts of propionitrile, 3.0 parts of valero and butyro nitriles, 2.5 parts of naphthalene, and smaller amounts of light hydrocarbons such as benzene. The tail gases contain, for example, about 33% (by volume) of hydrogen, 39% of methane, and 28% of olefins (mainly ethylene). No substantial amount of nitrogen is formed.

Recovery of acrylonitrile from the liquid reaction products obtained in the process can be effected by fractional distillation to separate a crude nitrile fraction boiling, for example, from about 60° to about 80° C. HCN contained in the initial fraction can be recycled to the reactors, after redistillation, if required. The nitrile fraction is composed mainly of acrylonitrile and acetonitrile in a ratio of 3 parts by weight of acrylonitrile to 2 parts of acetonitrile, together with small amounts of benzene. The latter can be removed by fractional distillation, and acetonitrile can be separated from acrylonitrile by extraction with water, or steam distillation.

The following examples, wherein temperatures are in degrees centigrade, illustrate but do not limit the invention:

Example 1

A mixture of HCN and ethylene in molar ratio of 1.6:1 was passed at substantially atmospheric pressure at a space velocity of 1450 hrs.$^{-1}$ through a reactor comprising an externally heated "Vycor" tube (i. e. 96% silica) having an inside diameter of 19 mm. and 100 cm. in length, of which 15 cm., constituting the reaction zone, was maintained at a temperature of 840° C. The portion of the tube between its inlet end and the reaction zone was heated to a temperature approaching the reaction zone temperature and served as a preheater. The reaction mixture issuing from the reaction zone was passed through a series of condensers, cooled with water at about 20° C. and then through a trap cooled with an acetone-solid carbon dioxide mixture. Minor amounts of HCN contained in the tail gases from these condensers were absorbed in an aqueous caustic soda scrubber. The condensate obtained in the water-cooled condensers was fractionally distilled in a column, HCN being recycled for reuse in the process. A fraction boiling at 60° to 80° C. was collected and redistilled to obtain a mixture composed of 60% (by weight) of acrylonitrile and 40% of acetonitrile. The yield of acrylonitrile-acetonitrile mixture was 17.8% of theory, based on the amount of unrecovered HCN. The extent of reaction as indicated by the amount of ethylene consumed was about 9.4%. The weight ratio of the acrylonitrile-acetonitrile mixture to other liquid reaction products was 5.5:1.

*Example 2*

A mixture of HCN and ethylene in a molar ratio of 2.3:1 was passed through two reactors in series, similar to the reactor of Example 1, and a condenser between the reactors, cooled with water at about 20° C. to condense acrylonitrile produced in the first reactor. The gases issuing from the second reactor were passed through a series of condensers similar to those employed in Example 1. Both reactors were maintained at a temperature of 870° C. and the mixture was passed through the reactors at a space velocity of 660 hrs.$^{-1}$. The reaction products were worked up in the same manner as in the preceding example, to obtain a mixture containing 60% by weight of acrylonitrile and 40% acetonitrile. 21.8% of the ethylene employed reacted with HCN and the yield of acrylonitrile-acetonitrile mixture was 33.2% of theory, based on the amount of HCN consumed in the reaction. The ratio by weight of the acrylonitrile-acetonitrile mixture to other liquid reaction products was 1.2:1.

Upon modifying the operation in this example by increasing the reaction temperature to 875° C., reducing the ratio of HCN to ethylene to 2.1:1, and increasing the space velocity to 1060 hrs.$^{-1}$, 15.2% of the ethylene employed reacted with HCN. The yield of acrylonitrile-acetonitrile mixture was 29% of theory, and the weight ratio of the acrylonitrile-acetonitrile mixture to other liquid reaction products was 1.1:1.

*Example 3*

A mixture of ethylene and HCN in a molecular ratio of 2.28:1 was passed at substantially atmospheric pressure through a reactor comprising an externally heated, unpacked "Vycor" tube having a ¾" inside diameter, the reactor comprising a preheating section adjacent the inlet extending for about 8½" of its length and maintained at a temperature of about 500° C., and an adjoining reaction zone extending for about 12" of its length, adjacent its exit, and maintained at a temperature of 800° C. The gaseous mixture was introduced into the reactor at a space velocity of 493 hrs.$^{-1}$. The gases issuing from the exit end of the reactor were cooled by passing them around a cooling finger and through a cooling jacket, in both of which cooling water was circulated at 10° to 15° C., and then passed successively through a water-cooled condenser, and a series of traps cooled to —50° C. Residual HCN was removed from the tail gases by scrubbing with a 15% aqueous caustic soda solution. The condensates recovered from the water-cooled condenser and from the traps were combined and subjected to fractional distillation. The acrylonitrile fraction, containing acetonitrile, recovered was equivalent to a theoretical yield of the order of 60%, based on the amount of HCN consumed in the reaction, and the yield of propionitrile, similarly calculated, amounted to about 25% of theory. Higher boiling by-product nitriles, accounting for 15% to 20% of the consumed HCN, were recovered by distillation of the still residue under reduced pressure.

*Example 4*

A mixture of ethylene and HCN in a molecular ratio of 2.4:1 was preheated to 500° C., and pyrolyzed at 800° C. at a space velocity of 456 hrs.$^{-1}$ in the apparatus described in Example 3. Upon fractional distillation of the condensates recovered from the gaseous reaction mixture, acrylonitrile and propionitrile were obtained. The theoretical yield of acrylonitrile fraction, containing acetonitrile, was 60%, based on the quantity of HCN consumed, while the yield of propionitrile was 15.9% of theory.

*Example 5*

A mixture of ethylene and HCN in a molecular ratio of 2.41:1 was preheated to a temperature of 500° C., and pyrolyzed at a temperature of 825° C. at a space velocity of 455 hrs.$^{-1}$ in the apparatus employed in Example 3. Upon working up the condensates recovered from the pyrolyzed mixture in the manner described above, acrylonitrile and propionitrile were obtained. The theoretical yield of acrylonitrile-acetonitrile mixture, in terms of HCN consumed by the reaction, was 69.3%, and the yield of propionitrile was 3.8% of theory.

*Example 6*

A mixture of ethylene and HCN in a molecular ratio of 2.47:1 was preheated to a temperature of 500° C. and pyrolyzed at a temperature of 850° C. at a space velocity of 891 hrs.$^{-1}$ in the apparatus employed in the preceding examples. Upon fractional distillation of the condensates recovered from the pyrolyzed mixture, the yield of acrylonitrile fraction containing some acetonitrile was 66.2% of theory, based on the HCN consumed, and the yield of propionitrile was 2.3% of theory.

*Example 7*

A mixture of propylene and HCN in molecular ratio of 2.54:1 was preheated at 500° C. and pyrolyzed at 800° C. at a space velocity of 456 hrs.$^{-1}$ in the apparatus employed in Example 3. Upon fractional distillation of the condensates, as described in the preceding example, acrylonitrile-acetonitrile mixture was obtained in a theoretical yield of about 60%, based on the amount of HCN consumed.

*Example 8*

A mixture of HCN and propane in a molecular ratio of 3.2:1 was passed, at a space velocity of 1400 hrs.$^{-1}$, through a pair of reactors having a condenser system as employed in Example 2 and wherein the reaction zones were heated at 880° C. The reaction products were worked up as described in Example 2 to yield a mixture composed of about 60% by weight of acrylonitrile and 40% of acetonitrile. 29% of the propane employed reacted with HCN, and the yield of acrylonitrile-acetonitrile mixture was 36% of theory, based on the amount of HCN consumed in the reaction. The ratio by weight of the acrylonitrile-acetonitrile mixture to the other liquid reaction products was 2.1:1.

*Example 9*

A mixture of HCN and butene-1 in a molecular ratio of 4.2:1 was passed through the apparatus comprising two reactors and a condenser system as described in Example 2, at a space velocity of 1315 hrs.$^{-1}$, and wherein the reaction zones were heated at 875° C. The reaction products were worked up as in the preceding example to separate a mixture composed of about 60% of acrylonitrile and 40% of acetonitrile. 38% of the butene employed reacted with HCN, and the yield of the acrylonitrile-acetonitrile mixture was 39% of theory, based on the amount of HCN consumed in the reaction. The ratio by weight of the acrylonitrile-acetonitrile mixture to the other liquid reaction products was 1.9:1.

*Example 10*

A mixture of HCN and iso-butane in a molecular ratio of 3.9:1 was passed, at a space velocity of 1220 hrs.$^{-1}$, through a pair of reactors and condensing equipment as employed in Example 2, the reaction zones of the reactors being heated at 874° C. Upon working up the reaction products as described in Example 2, a mixture composed of about 60% of acrylonitrile and 40% of acetonitrile was obtained. 39% of the isobutane employed reacted with HCN, and the yield of acrylonitrile-acetonitrile mixture was 41% of theory, based on the amount of HCN consumed in the reaction. The ratio by weight of the acrylonitrile-acetonitrile mixture to other liquid reaction products was 2.4:1.

*Example 11*

A mixture of HCN and n-butane in a molecular ratio of 3.4:1 was passed through apparatus comprising a pair of reactors with the condensing equipment described in Example 2, at a space velocity of 1150 hrs.$^{-1}$, the reaction zones being heated at a temperature of 870° C. A product composed of about 60% by weight of acrylonitrile and 40% of acetonitrile was recovered by condensation as in Example 2. 38% of the butane employed reacted with HCN, and the yield of acrylonitrile-acetonitrile mixture was 54% of theory, based on the amount of HCN consumed in the reaction. The ratio by weight of the acrylonitrile-acetonitrile mixture to other liquid reaction products was 2.2:1.

*Example 12*

A mixture of HCN and n-hexane in a molecular ratio of 2.8:1 was passed through the apparatus similar to that described in Example 1 at a space velocity of 1380 hrs.$^{-1}$, the reaction zones of said equipment being heated at a temperature of 869° C. Upon working up the reaction products as described in Example 2, a mixture composed of about 60% by weight of acrylonitrile and 40% of acetonitrile was obtained in a yield amounting to 32.7% of theory, based on the amount of HCN consumed in the reaction. 27.8% of the n-hexane employed reacted with the HCN, and the ratio by weight of the acrylonitrile-acetonitrile mixture to the other liquid reaction products was 1.2:1.

*Example 13*

32 grams per hour of No. 2 fuel oil (a paraffinic petroleum fraction boiling from 250° to 400° C.) were vaporized and mixed with 50 grams per hour of HCN and the resulting mixture passed through the apparatus described in Example 2, the reaction zones being heated at a temperature of 871° C. The foregoing rates of passage of the reagents through the reaction zones corresponded to a space velocity for the gaseous mixture amounting to about 975 hrs.$^{-1}$. 28.1 grams of a 60% acrylonitrile-40% acetonitrile mixture were obtained per 100 grams of fuel oil employed, the field of the nitrile mixture being 39.1% of theory, based on the amount of HCN consumed in the reaction. The ratio by weight of the acrylonitrile-acetonitrile mixture to other liquid reaction products was 0.7:1.

*Example 14*

Three mixtures of HCN and n-butane in molecular ratios of 1.8:1, 2.7:1, and 3.1:1, respectively, were passed through the apparatus of Example 1, comprising a single reactor heated to a temperature of 840° to 845° C., at space velocities from 1200 to 1450 hrs.$^{-1}$. The products were collected and worked up as described in Example 1 to obtain a mixture of about 60% by weight of acrylonitrile and 40% of acetonitrile. The yields of these mixtures in per cent of theory, based on the amount of HCN consumed in the reaction, the per cent of butane which reacted with the HCN, and the weight ratio of the aforesaid nitrile mixture to other liquid reaction products were as follows:

| Run | Temperature | Mols HCN, Mols Butane | Space Veloc. hrs.$^{-1}$ | Per Cent Yield | Per Cent Butane Reacted | Nitrile Fraction Liquid Byproduct |
|---|---|---|---|---|---|---|
| | °C. | | | | | |
| 1 | 845 | 1.8:1 | 1,200 | 4.6 | 8.3 | 2.8:1 |
| 2 | 840 | 2.7:1 | 1,450 | 10.5 | 28.9 | 4.4:1 |
| 3 | 840 | 3.1:1 | 1,350 | 6.6 | 19.7 | 4.4:1 |

*Example 15*

A series of mixtures of HCN and n-butane in various molecular proportions between 1.3:1 and 3.6:1 were passed through the apparatus of Example 2 comprising a pair of reactors in series with condensing equipment including a condenser between the two reactors, at space velocities from 530 to 1470 hrs.$^{-1}$, the reaction zones being heated at various temperatures from 810° to 940° C. The reaction products were condensed as in Example 2 and worked up in the same manner to separate a nitrile fraction containing about 60% by weight of acrylonitrile and 40% of acetonitrile. The yield in per cent of theory of the acrylonitrile-acetonitrile mixture, based on the amount of HCN consumed, the per cent of butane which reacted with HCN, and the ratio by weight of the aforesaid nitrile fraction to other liquid products are given in the following table:

| Run | Temperature | Mols HCN, Mols Butane | Space Veloc. hrs.$^{-1}$ | Per Cent Yield | Per Cent Butane Reacted | Nitrile Product Liquid Byproduct |
|---|---|---|---|---|---|---|
| | °C. | | | | | |
| 1 | 810 | 1.3:1 | 1,370 | 26 | 14 | 5.1:1 |
| 2 | 837 | 2.9:1 | 1,320 | 49 | 30 | 2.3:1 |
| 3 | 845 | 1.9:1 | 810 | 42.5 | 20.5 | 1.6:1 |
| 4 | 877 | 1.7:1 | 530 | 55 | 39.4 | 1.7:1 |
| 5 | 873 | 3.3:1 | 749 | 55 | 41.8 | 2.18:1 |
| 6 | 870 | 3.4:1 | 1,150 | 54 | 38 | 2.2:1 |
| 7 | 867 | 2.1:1 | 1,290 | 49 | 25 | 2.7:1 |
| 8 | 870 | 1.5:1 | 1,320 | 47 | 18 | 1.6:1 |
| 9 | 905 | 3.6:1 | 1,230 | 42 | 39 | 2:1 |
| 10 | 940 | 3.5:1 | 1,280 | 32.5 | 33 | 1.6:1 |

We claim:

1. A process for the preparation of acrylonitrile, which comprises reacting a gaseous mixture of HCN and aliphatic non-acetylenic hydrocarbon having at least 2 carbon atoms, in a reaction zone at a temperature of 750° to 1000° C.

2. A process for the preparation of acrylonitrile, which comprises reacting a gaseous mixture of HCN and aliphatic non-acetylenic hydrocarbon having at least 2 carbon atoms, in a reaction zone at a temperature of 750° to 1000° C. for a period of 0.5 to 3.25 seconds, and cooling the resulting gases to prevent decomposition of acrylonitrile.

3. A process for the preparation of acrylonitrile, which comprises passing a gaseous mixture of HCN and aliphatic non-acetylenic hydrocarbon having at least 2 carbon atoms through a substantially non-catalytic reaction zone at a temperature of 750° to 1000° C., at a space velocity of 300 to 1500 hrs.$^{-1}$, and cooling the resulting gases to prevent decomposition of acrylonitrile.

4. A process for the preparation of acrylonitrile, which comprises passing a gaseous mixture of HCN and aliphatic non-acetylenic hydrocarbon having at least 2 carbon atoms, through a non-catalytic reaction zone at a temperature of 750° to 1000° C. at substantially atmospheric pressure at a space velocity of 300 to 1500 hrs.$^{-1}$, the space velocity being correlated with the temperature so that lower space velocities are maintained at lower reaction temperatures and higher space velocities are maintained at higher reaction temperatures, and cooling the resulting gases to prevent decomposition of acrylonitrile.

5. A process for the preparation of acrylonitrile, which comprises passing a gaseous mixture of HCN and aliphatic non-acetylenic hydrocarbon having at least 2 carbon atoms, in a weight ratio of from 1:5 to 5:1, through a non-catalytic reaction zone at a temperature of 750° to 1000° C., and at a space velocity of 300 to 1500 hrs.$^{-1}$, and cooling the resulting gases to prevent decomposition of acrylonitrile.

6. A process for the preparation of acrylonitrile, which comprises passing a gaseous mixture of HCN and aliphatic non-acetylenic hydrocarbon having at least 2 carbon atoms, in a weight ratio from 1:5 to 5:1, serially through a plurality of non-catalytic reaction zones at a temperature of 750° to 1000° C., and a space velocity from 300 to 1500 hrs.$^{-1}$, and cooling the gaseous reaction mixture as it issues from each reaction zone to recover acrylonitrile from the mixture by condensation.

7. A process for the preparation of acrylonitrile, which comprises passing a gaseous mixture of HCN and aliphatic non-acetylenic hydrocarbon having at least 2 carbon atoms, in a weight ratio from 1:5 to 5:1, through a non-catalytic reaction zone at a temperature of 800° to 900° C. at substantially atmospheric pressure, and at a space velocity of 450 to 1500 hrs.$^{-1}$, and cooling the resulting gases to prevent decomposition of acrylonitrile.

8. A process for the preparation of acrylonitrile, which comprises passing a gaseous mixture of HCN and aliphatic non-acetylenic hydrocarbon having at least 2 carbon atoms, in a molecular ratio from 1:5 to 5:1 and containing less than 20 mol per cent of water vapor, through a non-catalytic reaction zone at a temperature of 800° to 900° C. at substantially atmospheric pressure, and at a space velocity of 450 to 1500 hrs.$^{-1}$, and cooling the resulting gases to prevent decomposition of acrylonitrile.

9. A process for the preparation of acrylonitrile, which comprises passing a gaseous mixture consisting essentially of HCN and aliphatic non-acetylenic hydrocarbon having at least 2 carbon atoms, in a molecular ratio from 5:1 to 1:5 through a non-catalytic reaction zone at a temperature of 850° to 870° C., at substantially atmospheric pressure, and at a space velocity of 750 to 1200 hrs.$^{-1}$, and cooling the resulting gases to prevent decomposition of acrylonitrile.

10. A process for the preparation of acrylonitrile, which comprises passing a gaseous mixture consisting essentially of HCN and ethylene in a molecular ratio from 1:5 to 5:1 through a non-catalytic reaction zone at a temperature of 800° to 900° C. at substantially atmospheric pressure, and at a space velocity of 450 to 1500 hrs.$^{-1}$, and cooling the resulting gases to prevent decomposition of acrylonitrile.

11. A process for the preparation of acrylonitrile, which comprises passing a gaseous mixture consisting essentially of HCN and butane in a molecular ratio from 5:1 to 1:5 through a non-catalytic reaction zone at a temperature of 850° to 870° C. at substantially atmospheric pressure, and at a space velocity of 750 to 1200 hrs.$^{-1}$, and cooling the resulting gases to prevent decomposition of acrylonitrile.

12. A process for the preparation of acrylonitrile, which comprises passing a gaseous mixture of HCN and a vaporized light petroleum fraction in a weight ratio of 5:1 to 1:5 through a non-catalytic reaction zone at a temperature of 800° to 900° C. at substantially atmospheric pressure, and at a space velocity of 500 to 2000 hrs.$^{-1}$, and cooling the resulting gases to prevent decomposition of acrylonitrile.

13. A process as specified in claim 1 in which the hydrocarbon reactant boils within the range of −104° C. to 400° C.

14. A process as specified in claim 9 in which the hydrocarbon boils within the range of −104° C. to 400° C.

FRANK PORTER.
GLENN A. NESTY.

REFERENCES CITED

The following references are of record in the file of this patent:

UNITED STATES PATENTS

| Number | Name | Date |
|---|---|---|
| 1,920,795 | Jaeger | Aug. 1, 1933 |
| 1,995,136 | Winkler et al. | Mar. 9, 1935 |
| 2,057,282 | Tramm et al. | Oct. 13, 1936 |
| 2,370,849 | Dutcher | Mar. 6, 1945 |
| 2,381,709 | Apgar et al. | Aug. 7, 1945 |
| 2,385,741 | Teter | Sept. 25, 1945 |

OTHER REFERENCES

Carpenter et al.: Chem. Zentr., vol. 1911, I, page 1531.

Thompson, Trans. Faraday Soc., vol. 37, pages 344–352 (1941).